(12) United States Patent
Neet

(10) Patent No.: US 11,605,989 B2
(45) Date of Patent: Mar. 14, 2023

(54) STATOR WINDING WITH ALTERNATING WINDING PITCHES

(71) Applicant: BorgWarner Inc., Auburn Hills, MI (US)

(72) Inventor: Kirk Neet, Noblesville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 188 days.

(21) Appl. No.: 17/105,969

(22) Filed: Nov. 27, 2020

(65) Prior Publication Data

US 2021/0159743 A1 May 27, 2021

Related U.S. Application Data

(60) Provisional application No. 62/941,362, filed on Nov. 27, 2019.

(51) Int. Cl.
| | | |
|---|---|---|
| *H02K 1/16* | (2006.01) | |
| *H02K 3/12* | (2006.01) | |
| *H02K 3/02* | (2006.01) | |

(52) U.S. Cl.
CPC ............. *H02K 1/165* (2013.01); *H02K 3/12* (2013.01); *H02K 1/16* (2013.01); *H02K 3/02* (2013.01); *H02K 2213/03* (2013.01)

(58) Field of Classification Search
CPC ...... H02K 1/16; H02K 1/165; H02K 2213/03; H02K 3/00; H02K 3/02; H02K 3/12
USPC ................................... 310/179, 181, 184, 208
See application file for complete search history.

(56) References Cited

U.S. PATENT DOCUMENTS

| | | | |
|---|---|---|---|
| 7,005,772 B1 | 2/2006 | Frederick et al. | |
| 7,034,428 B2 | 4/2006 | Cai | |
| 9,748,811 B2 * | 8/2017 | Asano | H02K 3/12 |
| 9,893,583 B2 * | 2/2018 | Tamura | H02K 3/34 |
| 11,381,129 B2 * | 7/2022 | Sheu | H02K 1/16 |

(Continued)

FOREIGN PATENT DOCUMENTS

WO 2019152773 A1 8/2019

OTHER PUBLICATIONS

International Search Report corresponding to International Patent Application No. PCT/US2020/062502, dated Apr. 29, 2021 (4 pages).

(Continued)

*Primary Examiner* — Rashad H Johnson
(74) *Attorney, Agent, or Firm* — Maginot, Moore & Beck, LLP

(57) ABSTRACT

A stator for an electric machine includes a stator core with a multi-phase winding arranged on the stator core. The stator core has a plurality of slots formed therein and defines a first axial end and a second axial end. The multi-phase winding includes multiple parallel paths for each winding phase, each parallel path completing multiple revolutions around the stator core, and each parallel path comprising a series of slot segments arranged in layers of the plurality of slots and end turns alternately connecting consecutive slot segments on the first axial end and the second axial end. A pitch of the end turns connecting the slot segments for at least one parallel path alternates between a first pitch on the first axial end and a second pitch on the second axial end, the second pitch being different from the first pitch.

18 Claims, 18 Drawing Sheets

(56) References Cited

U.S. PATENT DOCUMENTS

2018/0034335 A1    2/2018  Neet et al.
2022/0216758 A1*  7/2022  Bernauer ........... H02K 15/0478

OTHER PUBLICATIONS

Written Opinion of the International Searching Authority corresponding to International Patent Application No. PCT/US2020/062502, dated Apr. 29, 2021 (6 pages).

* cited by examiner

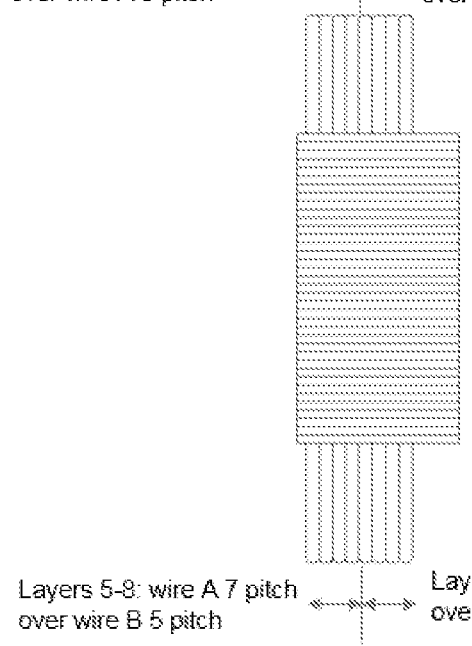
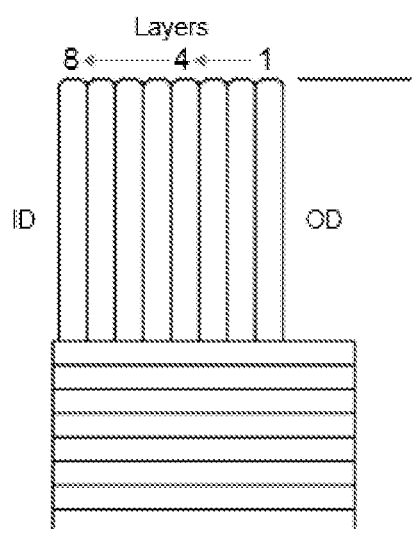
FIG. 9A  FIG. 9B

STATOR WINDING WITH ALTERNATING WINDING PITCHES

CROSS-REFERENCE TO RELATED APPLICATIONS

This patent document claims priority from U.S. Provisional Patent Application Ser. No. 62/941,362, filed Nov. 27, 2019, the entire contents of which are incorporated by reference herein.

FIELD

This application relates to the field of electric machines, and more particularly, winding arrangements for electric machines.

BACKGROUND

Electric machines are designed to meet specific operating requirements depending on the intended application the electric machine. Depending on the specific design of the electric machine, the machine will have various performance characteristics. Examples of design features that contribute to operating performance include stator size, rotor size, torque output, efficiency, type and arrangement of the of windings, number of stator slots, number of poles, slots per pole per phase, number of conductors per slot, number of parallel paths per phase, number of turns, and any of various other design parameters as will be recognized by those of ordinary skill in the art.

When designing electric machines, it is desirable to provide an electric machine that is capable of meeting predetermined performance characteristics while also offering advantages over prior art designs. For example, would be advantageous to provide an electric machine with an improved winding arrangement that has reduced electrical resistance over previous designs. It would also be advantageous to provide an electric machine that has a smaller size than previous designs. Furthermore, it would be advantageous to provide an electric machine that is easier to manufacture than previous designs.

While it would be desirable to provide an electric machine that provides one or more of the foregoing or other advantageous features, as may be apparent to those reviewing this disclosure, the teachings disclosed herein extend to those embodiments which fall within the scope of the appended claims, regardless of whether they accomplish one or more of the above-mentioned advantages.

SUMMARY

In accordance with at least one embodiment of the disclosure, a stator for an electric machine includes a stator core and a winding arranged on the stator core. The stator core has a plurality of slots formed therein and defines a first axial end and a second axial end. The winding includes slot segments arranged in layers of the plurality of slots and end turns connecting the slot segments. The winding defines a first winding path and a second winding path. The first winding path includes outer layer end turns, inner layer end turns, and a transition end turn positioned between the outer layer end turns and the inner layer end turns. The second winding path includes outer layer end turns, inner layer end turns, and a transition end turn positioned between the outer layer end turns and the inner layer end turns. The outer layer end turns of the second winding path nest with the outer layer end turns of the first winding path, and wherein the inner layer end turns of the second winding path nest with the inner layer end turns of the first winding path.

In at least one additional embodiment of the disclosure, a stator for an electric machine includes a stator core with a multi-phase winding arranged on the stator core. The stator core has a plurality of slots formed therein and defines a first axial end and a second axial end. The multi-phase winding includes multiple parallel paths for each winding phase, each parallel path completing multiple revolutions around the stator core, and each parallel path comprising a series of slot segments arranged in layers of the plurality of slots and end turns alternately connecting consecutive slot segments on the first axial end and the second axial end. A pitch of the end turns connecting the slot segments for at least one parallel path alternates between a first pitch on the first axial end and a second pitch on the second axial end, the second pitch being different from the first pitch.

BRIEF DESCRIPTION OF THE DRAWINGS

FIG. 9A shows a cross-sectional view of a stator including the winding arrangement of FIGS. 4-8;

FIG. 9B is an enlargement of the upper end turns of the cross-sectional view of the stator of FIG. 9A;

DESCRIPTION

Figure 1:
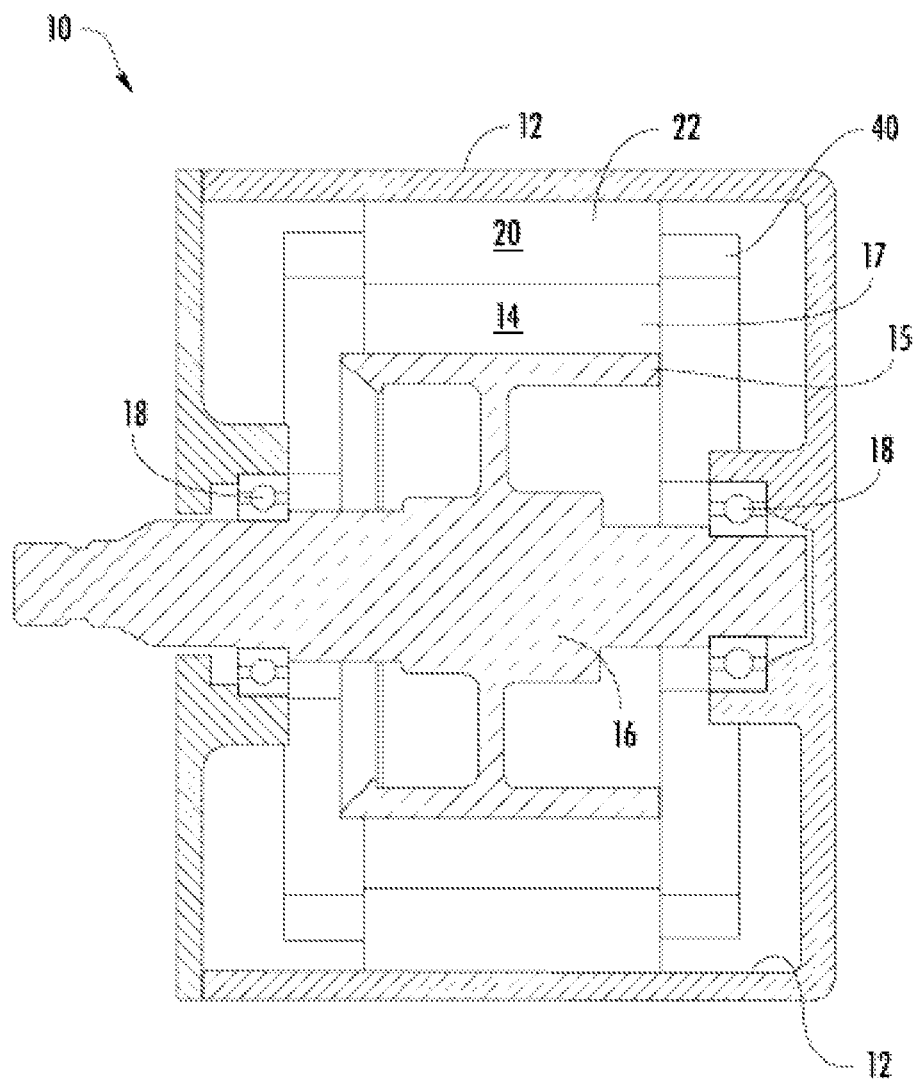
FIG. 1 shows a cross-sectional view of an electric machine including a stator with a winding arrangement.
Figure 2:
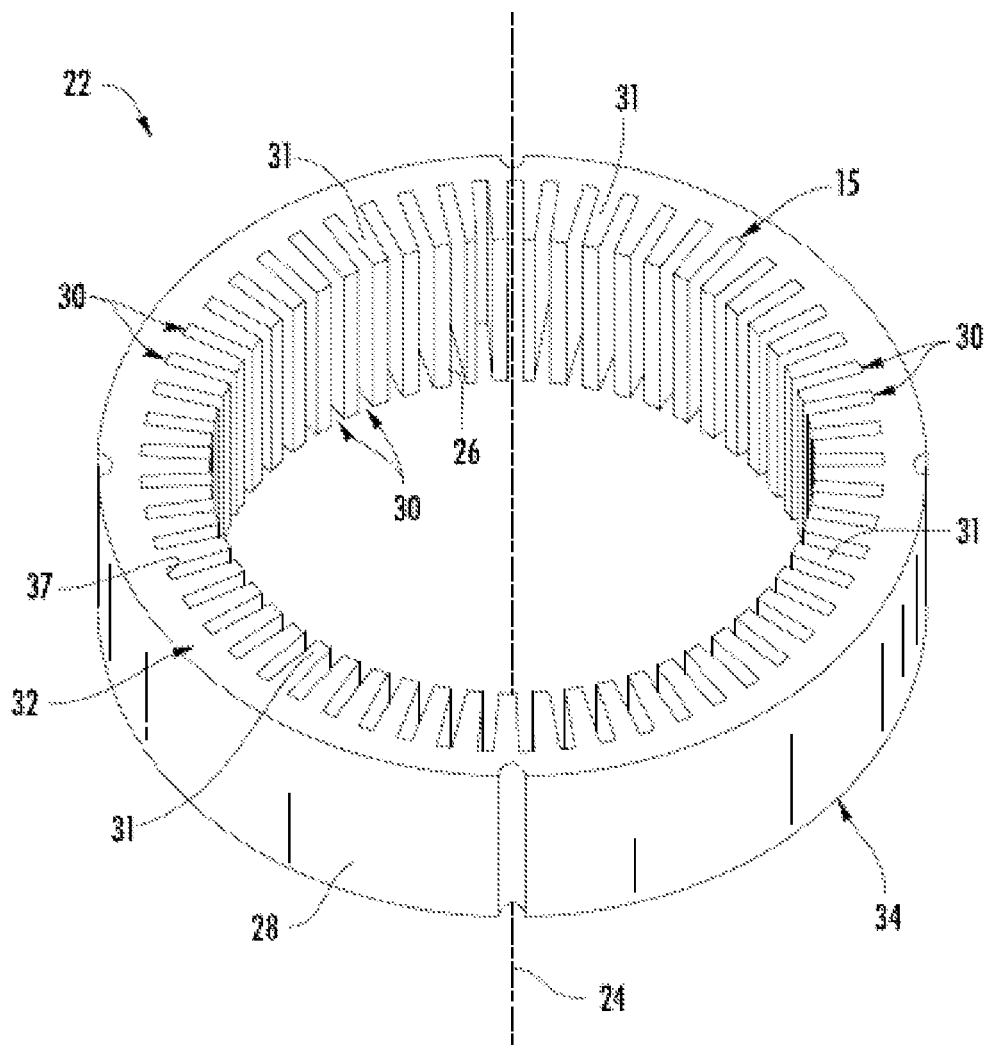
FIG. 2 shows a perspective view of a stator core of the electric machine of FIG. 1.
Figure 3:
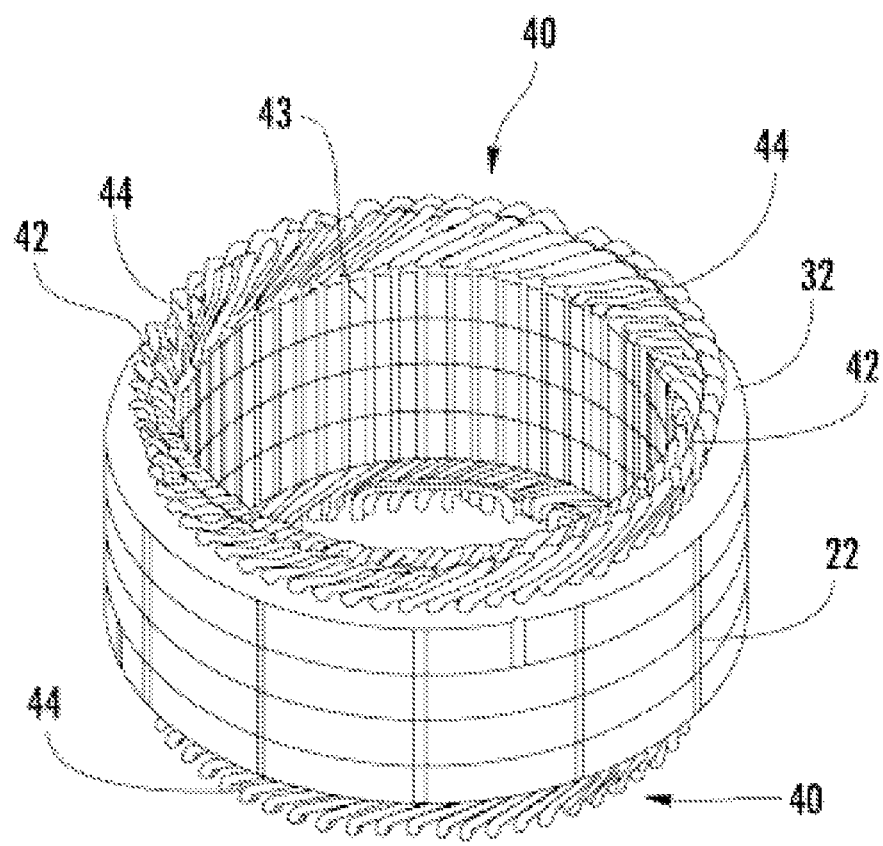
FIG. 3 shows a perspective view of the stator core of FIG. 2 with the winding arrangement positioned on the stator core.

With reference to FIGS. 1-3, an electric machine 10 includes a housing 12 with a stator assembly 20 and a rotor assembly 14 positioned within the housing 12. The stator assembly 20 includes a stator core 22 with a winding arrangement 40 positioned on the stator core 22. As disclosed herein, the winding arrangement is configured with multiple winding paths, each having alternating winding pitches that allow for nesting of the end turns of the electric machine.

Electric Machine

The rotor assembly 14 is positioned inside of the stator core 22 and is mounted on a shaft 16. The shaft 16 is rotatably supported by bearings 18. The shaft 16, in turn, supports the rotor assembly 14. The rotor assembly 14 includes a rotor hub 15 that is fixed relative to the shaft 16, and a rotor lamination 17 that is fixedly secured to the rotor hub 15 and configured to rotate relative to stator 20. As will be recognized, the rotor assembly may take any of a number of different forms, depending on the type of electric machine. In at least one embodiment, permanent magnets (not shown) are mounted on the rotor lamination 17. In at least one alternative embodiment, electrical windings (not shown) are positioned on the rotor lamination 17. The rotor 14 and shaft 16 are configured to rotate relative to the housing 12, while the stator assembly 20 remains stationary relative to the housing 12.

The stator assembly 20 includes both the stator core 22 and the winding arrangement 40. The stator core 22 is comprised of a ferromagnetic material and is typically formed from a plurality of steel sheets that are stamped and stacked upon one another to form a lamination stack. As best shown in FIG. 2, the stator core 22 is generally cylindrical in shape as defined by a center axis 24, a first axial end 32, and a second axial end 34. The first axial end 32 may also be referred to herein as an "upper" end, and the second axial end 34 may be referred to herein as a "lower" end. However, it will be recognized that the terms "upper" and "lower" are used herein are not intended to identify any particular orientation of the stator core or the windings, and are merely for the sake of convenience to identify different ends associated with the stator core 22 as shown in the figures.

With continued reference to FIG. 2, the stator core 22 further includes an inner perimeter surface 26 and an outer perimeter surface 28. A plurality of teeth 31 are formed on the interior of the stator core 22 between the inner perimeter surface 26 and the outer perimeter surface 28. Each tooth extends radially inward and terminates at the inner perimeter surface 26. Axial slots 30 are formed in the stator core 22 between the teeth 31. Depending on the configuration of the teeth 31, the slots 30 may be open along the inner perimeter surface 26 of the stator core 16, as shown in FIG. 2, or may be semi-closed slots with each slot 30 having a smaller width near the inner perimeter surface 26 than the width closer to the outer perimeter surface 28. Openings to the slots 30 are provided through the inner perimeter surface 26 as well as the opposing ends 32 and 34 of the stator core 22. Each slot is defined by opposing radial walls and wires or other conductors are retained within the slots, as explained in further detail below.

The stator core 22 is configured to retain the winding arrangement 40 (which may also be simply referred to as a "winding") within the slots 30 of the stator core 22. The winding arrangement is formed from a plurality of conductors. It will be recognized that such conductors may be differently configured depending on the type of electric machine 10. In at least one embodiment, the winding arrangement 40 is formed from a plurality of elongated wires (e.g., copper wires) that are wound within the slots 30 on the stator core 22 in order to form winding paths the windings (e.g., a single strand of wire winds through the slots making one or more complete revolutions around the stator core). In at least one alternative embodiment, the winding paths for the winding arrangement 40 may be formed from a plurality of segmented conductors 42.

FIG. 3 shows a perspective view of the stator 20 with the conductors 42 of the winding arrangement 40 positioned in the slots of the stator core 22. It will be appreciated that the conductors 42 may be provided in an electric machine in any of various forms. For example, the windings may be formed from elongated lengths of wires that are pre-formed and inserted into the slots of the stator core. Alternatively, the windings may be formed from segmented conductors (also known as "hairpins" or "U-shaped" segments) that are inserted into the slots and connected together (e.g., via welds or other connection means).

Each of the conductors 42 include in-slot/axial portions 43 positioned in the slots, and end loop portions 44 (which may also be referred to as an "end-turn" or "U-turn" portions) extending between the in-slot portions (which may also be referred to herein as "slot segments"). The in-slot segments may be disposed in the lamination slots in a single file arrangement, with each position defining a layer with the slot. The layers may be defined from the outer layer nearest the lamination outer diameter (OD) to the inner layer near the lamination inner diameter (ID). For a stator having eight wires in a slot, the layers may be defined as follows: 1 (nearest to the OD), 2, 3, 4, 5, 6, 7 and 8 (nearest to the ID). For each path, a series of consecutive slot segments is defined with the end loop portions alternately connecting consecutive slot segments on the first axial end and the second axial end. As an example, a path may include a first slot segment in one slot, the first slot segment connected to an upper end turn, a consecutive second slot segment seven slots removed from the first slot segment and also connected to the upper end turn, and a lower end turn connected to the second slot segment. This series of one slot segment—followed by upper end turn—followed by a consecutive slot segment—and then followed by a lower end turn defines a complete sine-wave shaped portion for the winding path.

The U-turn portions 44 are clearly visible on the first end of 32 of the stator in FIG. 3. Each U-turn portion 44 extends over a number of slots on the first end 32 of the stator 20, and this number of slots (plus 1) defines an end loop "pitch" for the end turn. For example, if an end turn 44 extends over 5 slots (e.g., slot #1 to slot #7), then the end loops is defined has a 6 pitch end loop. In various embodiments, the winding may be interlaced (i.e., the majority of end loops connect a slot segment in one layer with a slot segment in another layer) or cascaded (i.e., majority of end loops connect a slot segment in one layer with a slot segment in the same layer). In any event, as explained in further detail below, the end turns 44 not all identical, as different end turns 44 are defined by different pitches, and/or may provided leads or other connections within the winding arrangement 40.

Winding Arrangement with Alternating Winding Pitches

In at least one embodiment the winding arrangement 40 is specifically configured as a winding arrangement including winding paths defining alternating winding pitches. The winding arrangement 40 is a multi-phase winding arrangement with each phase including multiple winding paths, and particularly multiple parallel paths. For example, the winding arrangement may be a three-phase winding arrangement (e.g., U-phase, V-phase and W-phase) with each phase including multiple parallel-connected winding paths (which may be referred to herein as "parallel paths").

In at least some embodiments, the winding arrangement 40 may have two slots per pole per phase, with the standard winding pitch (N) equal to the # of slots per pole per phase times the number of phases. Thus, for a stator having two slots per pole per phase and three phases, the winding arrangement has a standard pitch equal to six (i.e., N=2× 3=6). This means, for example, an end loop having a standard pitch of six will connect a slot segment disposed in slot #1 with a slot segment disposed in slot #7. End loops that do not have a standard pitch will have pitch of one or two less or one or two more than the standard pitch. Thus, if the standard pitch is six, end loops that do not have the standard pitch may have a pitch equal to four, five, seven or eight.

A first exemplary embodiment of winding arrangement 40 having alternating winding pitches is disclosed in association with FIGS. 4-10. The winding arrangement 40 is a three-phase winding arrangement with each phase including four parallel paths, and eight layers of conductors in each slot of the winding core. As explained in further detail herein, the stator winding has N+1 pitch end loops on one end and N-1 pitch end loops on the opposite end. A plurality of transition end loops are also provided. The transition end loops define a location in the winding path where a change occurs, such as special end loops that create a desired phase shift.

Figure 4:
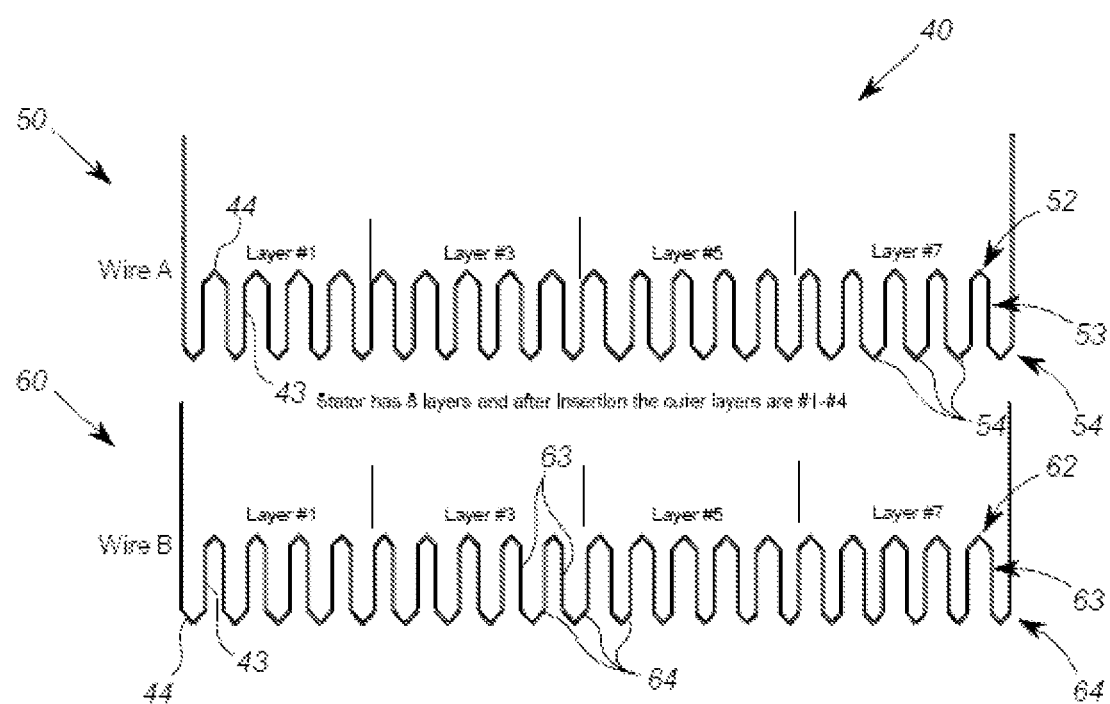
FIG. 4 shows a plan view of two wires for one phase of the winding arrangement of the electric machine of FIG. 1.

With particular reference now to FIG. 4, two lengths of elongated wire 50 and 60 are shown, each used for one of four winding paths in a single phase (e.g., phase U) of the first exemplary embodiment of the winding arrangement 40. Elongated wire 50 (which may be identified as "Wire A" or "Winding Path A" for convenience) serves as one parallel path for one phase in the winding arrangement 40, and elongated wire 60 (which may be identified as "Wire B" or "Winding Path B" for convenience) serves as another parallel path for the winding arrangement 40. Each wire 50, 60 is shown in a bent configuration prior to installation on the stator core 22. As a result of this bent configuration, each wire 50, 60 defines in-slot portions 43 and end loop portions 44. More particularly, Wire A 50 defines upper end loops 52 (for installation on a first axial end of the stator core), in-slot portions 53, and lower end loops 54 (for installation on an opposing second axial end of the stator core). Wire A specifically includes nineteen upper end loops 52 and twenty lower end loops 54. In the same manner, Wire B 60 defines upper end loops 62 (for installation on said first axial end of the stator core), in-slot portions 63, and lower end loop portions 64 (for installation on the second axial end of the stator core). Wire B also specifically includes nineteen upper end loops 62 and twenty lower end loops 64.

As noted in FIG. 4, the in-slot portions 53 of Wire A are configured for arrangement in the odd layers of the slots of the stator core 22 (i.e., layer #1, #3, #5 and #7) associated with one phase of the winding (e.g., phase U). The same is true for the in-slot portions 63 of Wire B. Thus, although FIG. 4 shows Wires A and B prior to installation on the core, the in-slot portions 43 and loop portions are configured such that, following installation on the core 22, the in-slot portions 53, 63 are arranged in odd layers within the slots 30 of the core. Wires A and B are both sufficiently long to wind around the core four times (i.e., four revolutions) with the in-slot portions being arranged in layers #1, #2, #3, and #4.

Figure 5:
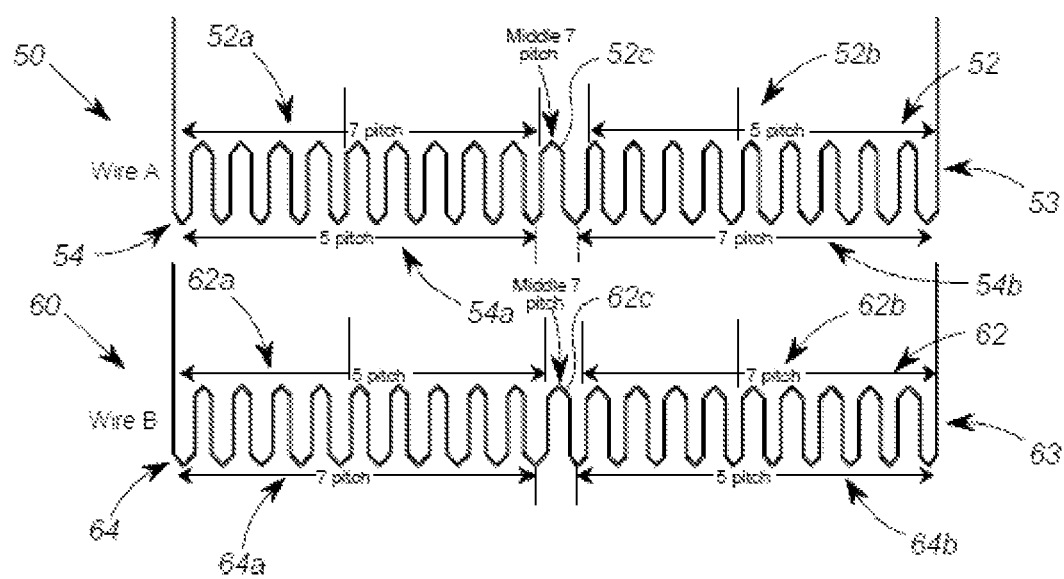
FIG. 5 shows a plan view of the two wires of FIG. 4 showing the pitch arrangement for the end turns.

FIG. 5 shows the same two wires as shown in FIG. 4 (i.e., Wire A 50 and Wire B 60), but FIG. 5 illustrates the different pitches of the end turns at different locations along each wire. The Wire A end turns include upper end turns 52 and lower end turns 54. The upper end turns 52 of Wire A include outer layer end turns 52a (i.e., upper end turns associated with outer layers #1 and #3), inner layer end turns 52b (i.e., upper end turns associated with inner layers #5 and #7), and a transition end turn 52c that extends between the outer and inner layers (i.e., between layers #3 and #5)(which transition end turn may also be referred to herein as a "middle end turn" because of its location between the inner and outer layers). The lower end turns 54 of Wire A include outer layer end turns 54a (i.e., lower end turns associated with outer layers #1 and #3), and inner layer end turns 54b (i.e., lower end turns associated with inner layers #5 and #7).

As shown on the left side of Wire A 50 in FIG. 5, the upper group of outer layer end turns 52a are defined by N+1 pitch end loops, and the lower group of outer layer end turns 54a are defined by N-1 pitch end loops (where N equals the standard winding pitch, as defined above). For example, as shown in FIG. 5, the upper outer layer end turns 52a of Wire A 50 have a seven pitch (i.e., 6+1) in outer layers #1 and #3, and the upper inner layer end turns 54a have a five pitch (i.e., 6-1) in outer layers #1 and #3.

As shown on the right side of Wire A 50 in FIG. 5, the upper group of inner layer end turns 52b are defined by N-1 pitch end loops, and the lower group of inner layer turns 54b are defined by N+1 pitch end loops (where N equals the standard winding pitch, as defined above). For example, as shown in FIG. 5, the upper inner layer end turns 52b of Wire A 50 have a five pitch (i.e., 6-1) in inner layers #5 and #7, and the lower inner layer end turns 54b have a seven pitch (i.e., 6+1) in inner layers #5 and #7. Accordingly, it will be recognized that the pitch of the end turns connecting the consecutive slot segments along each parallel path alternates between a first pitch on the first axial end (e.g., the upper end turns) and a second pitch on the second axial end (e.g., the lower end turns), the second pitch being different from the first pitch.

As shown in the middle of Wire A in FIG. 5, the upper middle end turn 52c is a phase-shifting end turn that also has a pitch=N+1. (i.e., 6+1=7 pitch). This upper middle end turn 52c extends from layer #3 to layer #5 and serves as the point on Wire A where the upper end turns 52 and lower end turns 54 switch their pitch. The middle end turns described herein will be recognized as creating a special phase shift similar to the middle end turns described in US Publication No. 2018/0034335 (U.S. Ser. No. 15/652,507) and U.S. Pat. No. 7,034,428, the contents of which are incorporated herein by reference in their entirety. As an example, these references disclose a stator having a N+1 (or N-1) pitch end loop located in the middle of the winding in order to cause the phase shift, which may result in one phase having 4-8-4 (or alternatively, 2-4-2) slot pattern (such as that described in further detail below in association with FIG. 10, wherein, for one pole, four slot segments are disposed in a left slot, eight slot segments are disposed a middle slot, and four slot segments are disposed in a right slot).

With continued reference to FIGS. 4 and 5, a close inspection of Wire A 50 and Wire B shows that these two wires are identical, but Wire B 60 is opposite the Wire A 50 with respect to the pitch of the end turns. Stated differently, Wire A and Wire B are identical in form, but Wire B is rotated 180° relative to Wire A about the apex of the upper middle end turn 52c. As a result, the left side of Wire A is the same as the right side of Wire B, and the right side of Wire A is the same as the left side of Wire B. Thus, as shown in FIGS. 4 and 5, the upper outer layer end turns 52a of Wire A are the same pitch as the upper inner layer end turns 62b of Wire B, and the upper inner layer end turns 52b of Wire A are the same pitch as the upper outer layer end turns 62a of Wire B. Similarly, the lower outer layer end turns 54a of Wire A are the same pitch as the lower inner layer end turns 64b of Wire B, and the lower inner layer end turns 54b of Wire A are the same pitch as the lower outer layer end turns 64a of Wire B. Because Wire A and Wire B are identical, they are interchangeable by merely rotating Wire B 180° relative to Wire A, and manufacture of the windings is greatly simplified since there is no need to manufacture two different configurations in order to form Wire A and Wire B.

In addition to Wire A 50 and Wire B 60, it will be recognized that two additional wires, Wire C and Wire D (not shown in FIGS. 4-9; see FIG. 10) are also provided in order to complete one phase of the winding arrangement of FIGS. 4-10. These wires are identical to Wire A 50 and Wire B 60 and are used to provide the two remaining parallel paths associated with the same phase as Wire A and Wire B (e.g., phase U). Wires C and D are configured for arrangement in the even layers of the slots of the stator core (i.e., layer #2, #4, #6 and #8) that are associated with that phase. Thus, Wires A-D provide one set of wires for one phase of the winding arrangement 40 electric machine. Upon installation on the stator core 22, Wires A-D are arranged in the slots 30 that are associated with such phase.

Furthermore, because the embodiment of the winding arrangement 40 in FIGS. 4-10 is a three-phase winding arrangement, it will also be recognized two additional sets of wires (not shown) are provided for each additional phase (e.g., phase Y and phase Z) in order to complete all phases of the winding arrangement. Each additional set of wires is identical to Wires A-D associated with the first phase (e.g., phase U). These additional sets of wires are then installed on the stator core 22 and arranged in the slots 30 associated with their respective phase.

Figure 6:
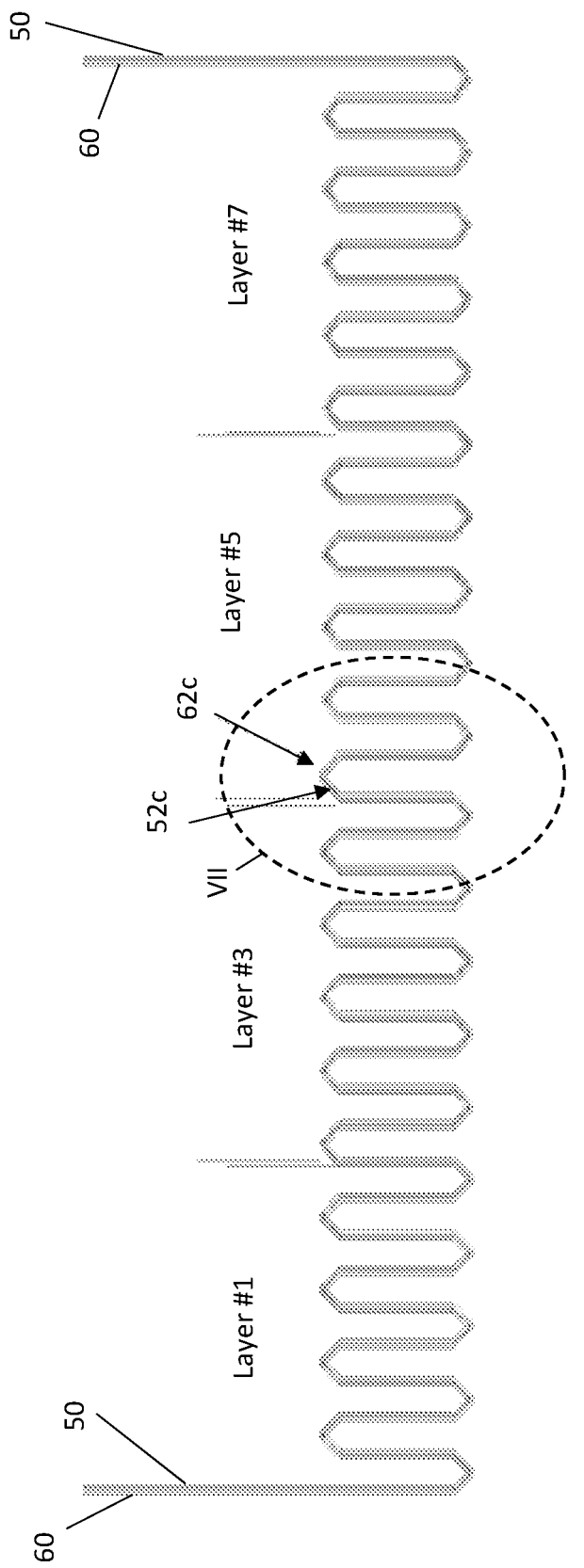
FIG. 6 shows a plan view of the two wires of FIG. 5 in a nested arrangement following installation on the stator core.
Figure 7:
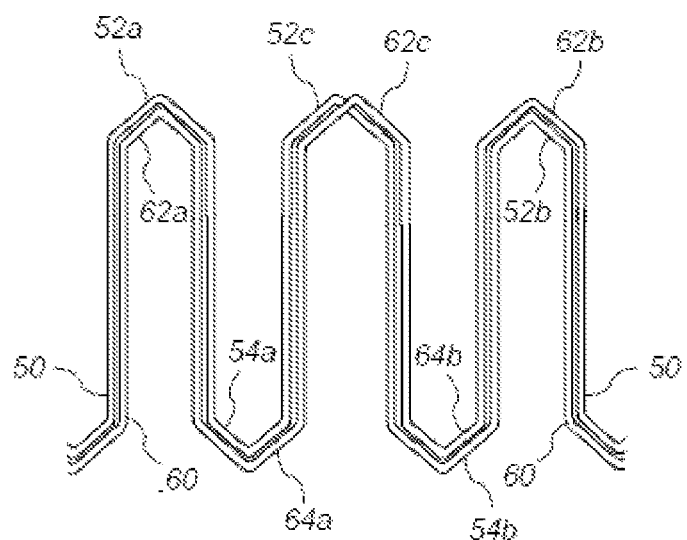
FIG. 7 shows an enlarged section of the wires of FIG. 6 including the middle end turns and adjacent end turns.

With reference now to FIGS. 6-7, a two-dimensional illustration is provided showing a linear representation of the arrangement of Wire A 50 in relation to Wire B 60 once the wires are both installed on the stator core 22. As shown in FIG. 6, the in-slot portions of Wire A 50 are always in one slot adjacent to the in-slot portions of Wire B 60. Stated differently, Wire A is either one slot to the left or one slot to the right of Wire B, depending on the slot observed. Moreover, all of the end turns of Wire A nest with the end turns of Wire B (i.e., the end turns are arranged over/under or outside/inside of one another) with the exception of the upper middle end turns 52c and 62c which cross one another. In other words, the end turns of Wire A are either nested over or nested under the end turns of Wire B, and vice-versa, depending on the layer in which the end turns are located, and thus the end turns of Wires A and B do not cross one another other than at one location along the length Wire A and Wire B. Specifically, the upper middle end turns 52c and 62c do cross one another at the cross-over between layers #3 and #5.

FIG. 7 shows an enlargement of the center portion of FIG. 6. As shown on the left side of FIG. 7, in outer layers #1 and #3, the upper outer layer end turns 52a of Wire A (which have a pitch of 7) extend completely over the upper outer layer end turns 62a of Wire B (which have a pitch of 5), and there is no contact or cross-over between Wires A and B at these end turn locations. In other words, end turns 52a nest outside end turns 62a, and thus end turns 62a can be considered to nest within end turns 52a. At the same time, the lower outer layer end turns 64a of Wire B (which have a pitch of 7) extend completely under the lower outer layer end turns 54a of Wire A (which have a pitch of 5), and there is no cross-over between Wires A and B at these end turn locations in outer layers #1 and #3. Stated differently, end turns 54a nest inside end turns 64a, and thus end turns 64a nest outside end turns 54a.

As shown on the right side of FIG. 7, in inner layers #5 and #7, the upper inner layer end turns 52b of Wire A (which have a pitch of 5) extend completely under the upper inner layer end turns 62b of Wire B (which have a pitch of 7), and there is no contact or cross-over between Wires A and B at these end turn locations. In other words, end turns 52b nest within end turns 62b, and thus end turns 62b can be considered to nest outside end turns 52b. At the same time, the lower inner layer end turns 64b of Wire B (which have a pitch of 5) extend inside of the lower inner layer end turns 54b of Wire A (which have a pitch of 7), and there is no cross-over between Wires A and B at these end turn locations in inner layers #5 and #7. Stated differently, end turns 54b nest outside end turns 64b, and thus end turns 64b nest within end turns 54b.

With continued reference to FIG. 7, the middle end turn 52c of Wire A and the middle end turn 62c of Wire B have an identical pitch (i.e., a pitch of 7). Because of this, Wires A and B cross at this location, and a phase shift results. An indication of this phase shift can be easily recognized in FIG. 7 because, on the left side of the middle end turns 52c and 62c, the upper end turns 52a of Wire A are outside the upper end turns 62a of Wire B, but to the right side of the middle end turns, the upper end turns 52b of Wire A are inside of the upper end turns 62b of Wire B. Similarly, on the left side of the middle end turns 52c and 62c, the lower end turns 54a of Wire A are inside the lower end turns 64a of Wire B, but to the right side of the middle end turns, the lower end turns 54b of Wire A are outside of the lower end turns 64b of Wire B.

Figure 8:
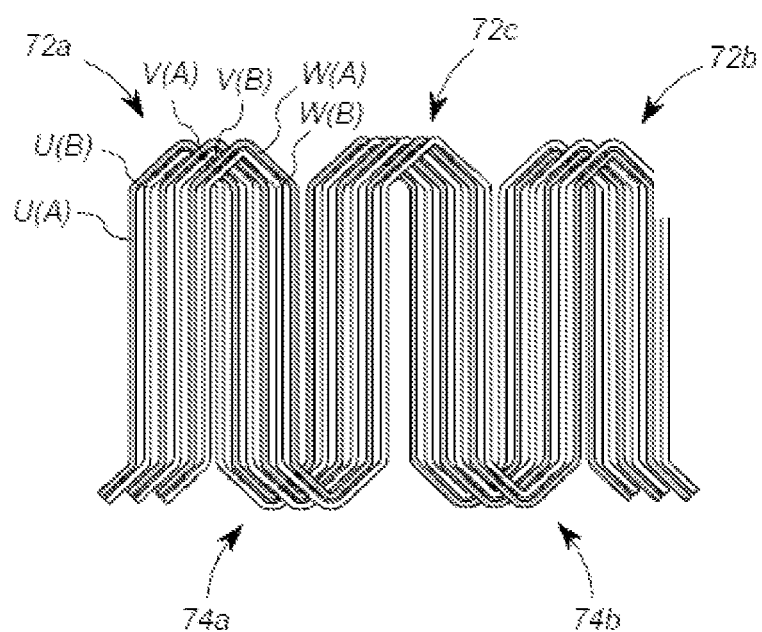
FIG. 8 shows the middle end turns of FIG. 7 in addition to the additional middle end turns for two additional phases of the winding arrangement.

FIG. 8 is similar to FIG. 7, but shows the middle end turns for Wires A and B of all three phases (i.e., phase-U, phase-V and phase-W) of the winding arrangement. In this figure, phase-U Wire A is designated U(A), phase-U Wire B is designated U(B), phase-V Wire A is designated V(A), phase-V Wire B is designated V(B), and phase-W Wire A is designated W(A), phase-W Wire B is designated W(B). As shown on the left side of FIG. 8, at the upper outer end turns 72a, Wire A for each phase nests outside of Wire B for the same phase. Also, at the lower outer end turns 74a, Wire A for each phase nests within Wire B for the same phase. At the middle end turns 74c, Wire A crosses Wire B for each phase. Thereafter, at the upper inner end turns 72b, Wire A for each phase nests inside of Wire B for the same phase. Also, at the lower inner end turns 74b, Wire A for each phase nests outside Wire B for the same phase.

FIGS. 9A and 9B show cross-sectional views of a stator including the winding arrangement described in association with FIGS. 4-8. In FIG. 9A, the middle block with horizontal lines represents the laminations of the stator core (e.g., with the cut taken along one of the teeth); the vertical lines are the end turns showing the different layers. FIG. 9B shows an enlargement of the upper end turns of FIG. 9A, and the arrangement of layers 1-8 in the stator slots, moving from the outer layers to the inner layers.

Figure 10:
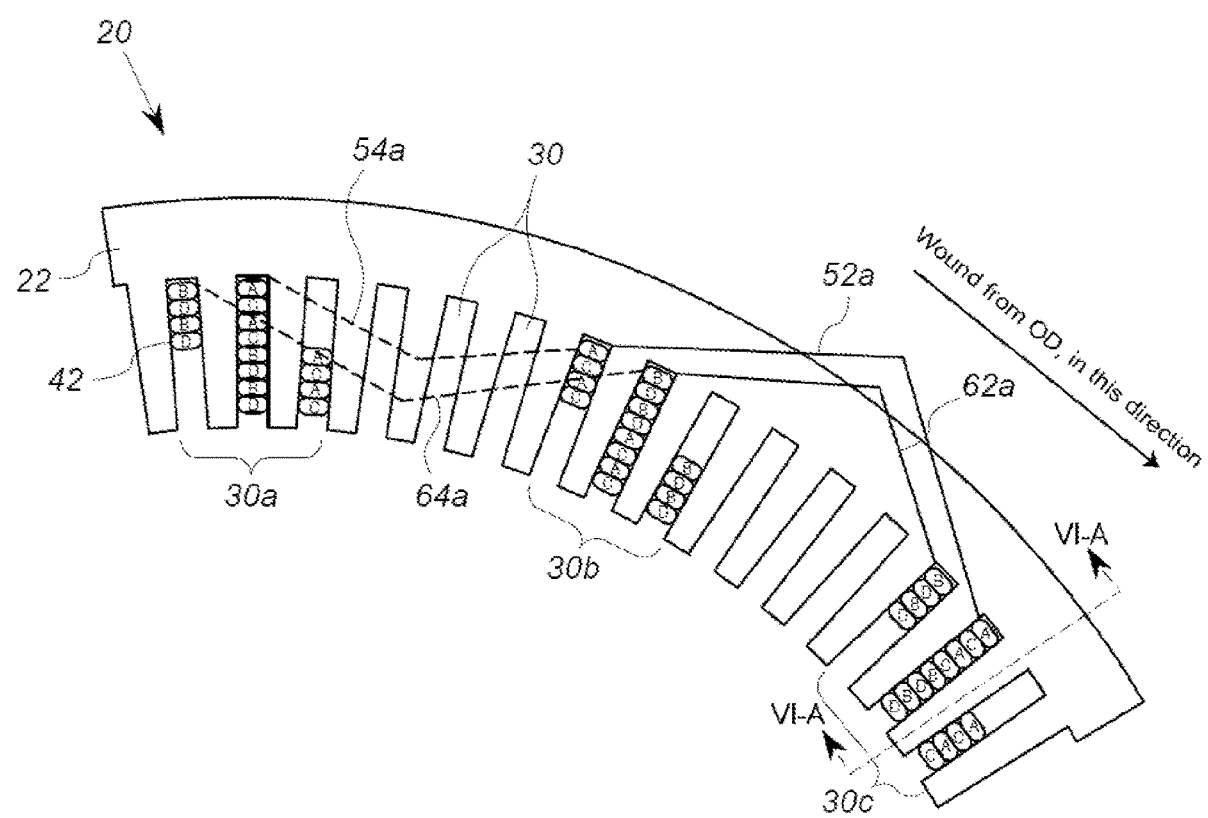
FIG. 10 shows a cross-sectional view of a portion of the stator core and winding arrangement of FIGS. 4-9, showing only those conductors for one phase of the winding arrangement.

With reference now to FIG. 10, a cross-sectional view of a portion of the stator assembly 20 is shown. The view of FIG. 10 shows the slots 30 of the stator core 22 with conductors 42 for one phase (e.g., phase-U) of the windings positioned therein. As discussed previously herein, each phase includes four parallel paths (e.g., Wires A-D discussed above). Accordingly, each of the conductors 42 in FIG. 10 includes one of labels "A", "B", "C", or "D" in order to show an association with one of the four parallel paths for the phase. Wires A and B are located in the odd layers of each slot, and Wires C and D are located in the even layers of each slot. The phase leads of Wires C and D are shifted one pole from the phase leads of Wires A and B. It will be recognized that phase-V and phase-W are similar to that shown for phase-U, but phase-V is shifted two slots clockwise from phase-U, and phase-W is shifted four slots clockwise from phase-U.

As shown in FIG. 10, the conductors from adjacent slots of each phase of the winding arrangement are all nested in some manner (e.g., over/outside or under/inside) and do not cross one another (other than the upper middle end turns 52c and 62c). For example, the upper end turns 52A for Path A are nested outside of the upper end turns 62a for Path B, and the lower end turns 54a for Path A are nested inside the lower end turns 64a for Path B. Similar nesting happens for the remaining conductors in adjacent slots for the same phase, as well as conductors in adjacent slots for other phases.

FIG. 10 also illustrates the 4-8-4 conductor arrangement for one phase of the winding over sets of three consecutive slots. With this 4-8-4 conductor arrangement four phase conductors are positioned closer to the OD in the first/left slot, eight phase conductors are positioned in the second/center slot, and four phase conductors are positioned closer to the ID in the third/right slot. FIG. 10 shows three different slot sets holding conductors for one phase of the winding, including a first slot set 30a, a second slot set 30b, and a third slots set 30c. The conductors in the first slot set 30a are connected to those in the second slot set 30b with lower end turns (i.e., end turns on one side of the stator core 22), and the conductors in the second slot set 30b are further connected to those in the third slot set 30c with upper end turns (i.e., end turns on an opposite side of the stator core). In the first slot set 30a and the third slot set 30c, the conductors in layers 1-4 of the left slot are respectively arranged B-D-B-D, the conductors in layers 1-8 of the middle slot are respectively arranged A-C-A-C-B-D-B-D, and the conductors in layers 5-8 of the right slot are respectively arranged A-C-A-C. In the second slot set 30b, the conductors in layers 1-4 of the left slot are respectively arranged A-C-A-C, the conductors in layers 1-8 of the middle slot are respectively arranged B-D-B-D-A-C-A-C, and the conductors in layers 5-8 of the right slot are respectively arranged B-D-B-D.

The winding arrangement shown in FIGS. 4-10 includes numerous advantages. First, all of Wires A-D are actually identical in shape even though Wires A and C appear to be different in shape from Wires B and D during installation. The identical shape of Wires A-D can be appreciated because each of Wires A-D are symmetrical about the middle end loop, thus allowing for each of Wires A-D to be formed by making the same zig zag shape, and then half the wires are flipped/rotated to create both A and C Wires and the B and D wires (e.g., the B and D wires are simply rotated about the middle end loop following formation in order to create the distinctions versus the A and C wires). Stated differently, Wire A and Wire B shown in FIGS. 4 and 5 may be created simultaneously, by forming identical sections of wire (i.e., two identical wires that look like "Wire A"), and then rotating one of the two wires 180° about the midpoint in order to form "Wire B." Because Wire C is the same as Wire A, and Wire D is the same as Wire B, all four wires may be formed simultaneously in the identical shape, and then two of the wires are rotated prior to installation on the stator core. Accordingly, a method is disclosed for forming a winding on a stator, wherein two or more wires (e.g., Wire A and Wire B) are created simultaneously, and one wire is then rotated 180° and nested with the other wire (e.g., as shown in FIG. 3), and these wires are then inserted into the slots of the stator.

Figure 11:
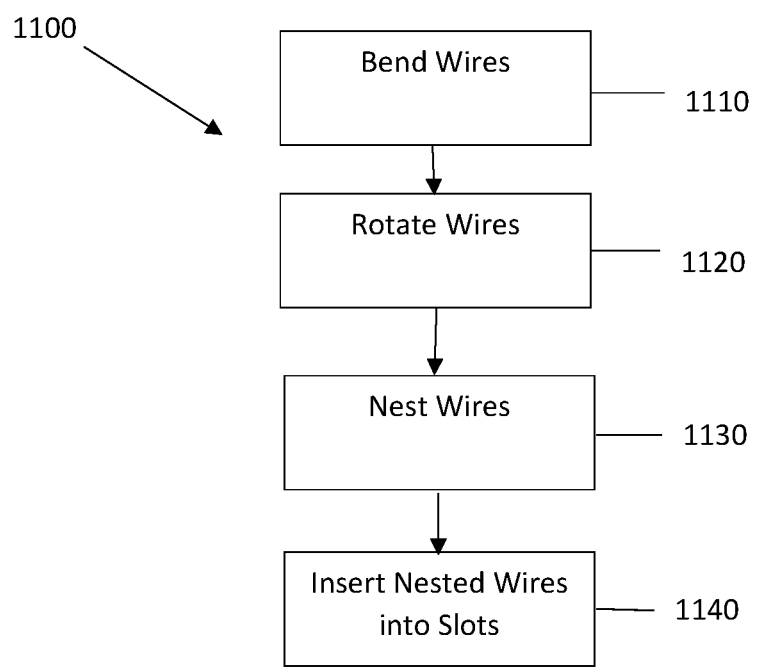
FIG. 11 is a flowchart for a method of making an electric machine including the winding arrangement shown in FIGS. 3-10.

FIG. 11 is a flowchart 1100 showing the above-mentioned method for forming a winding on a stator. As shown in FIG. 11, the method begins at block 1110 where a plurality of wires are bent to form an elongated length of wire with in-slot segments and end turns, similar to Wire A, shown in FIGS. 4 and 5. After bending, at least some of the wires are rotated 180° about the middle end turn, as noted in block 1120. This rotation of wires about the middle end turn results in two different sets of the wires, similar to Wire A and Wire B shown in FIGS. 4 and 5. Thereafter, as noted in block 1130, individual wires from each set of wires are moved into proximity of one another and nested together. For example, Wire A of FIGS. 4 and 5 is nested with Wire B, resulting in an arrangement similar to that shown in FIG. 6. Subsequently, as noted in block 1140, the nested wires are inserted into the slots of the stator core by starting at one end of the nested wires and sequentially inserting one slot segment after another into the slots of the stator core until arriving at the opposite end of the nested wires. Thereafter, or simultaneously therewith, additional wires that form other parallel paths in the winding are inserted into the slots of the stator core, layer-by-layer, until a complete winding is formed. Advantageously, the method of FIG. 11 allows a winding to be conveniently formed by bending multiple lengths of wire into a single shape, rotating some of the wires, nesting the wires, and then inserting the nested wires into the slots of the stator core.

In addition to the convenience of manufacture, the winding arrangement disclosed in FIGS. 4-10 also offers improved electric machine performance, including lower electrical resistance. Moreover, the space consumed by the electric machine is slightly reduced because following insertion of the windings on the stator core, the end turns are nested together, and are tighter than with other winding arrangements.

Alternative Embodiments for Winding Arrangement

Figure 12:
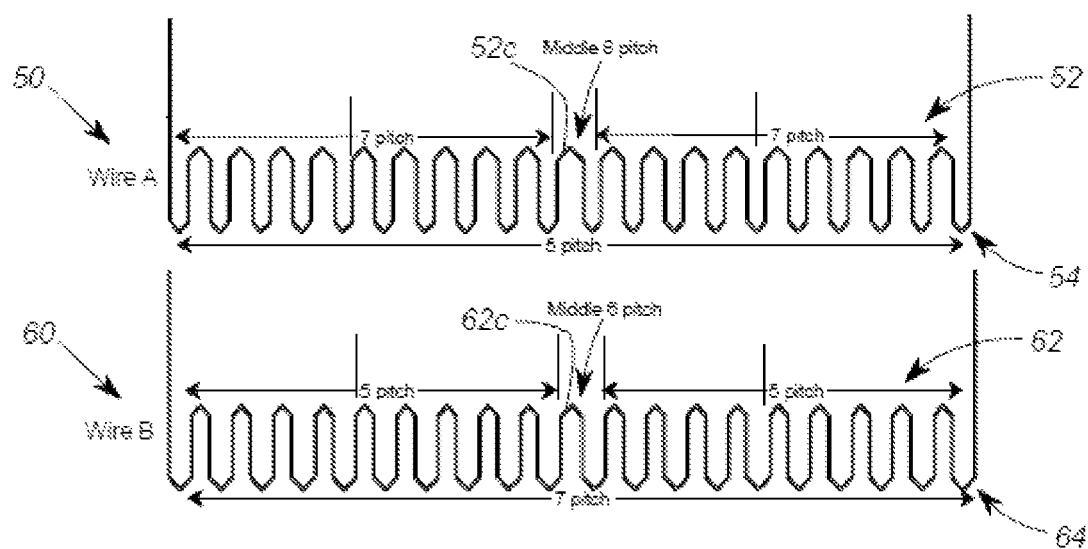
FIG. 12 shows a plan view of two wires for one phase of a first alternative embodiment of the winding arrangement shown in FIGS. 3-10.

With reference now to FIG. 12, in at least one first alternative embodiment, the winding arrangement 40 is configured similar to that described above with reference to FIGS. 4-10, but the pitches of the end loops are slightly different. In particular, the winding arrangement includes at least one Wire A 50 having N+1 pitch end loops 52 on the first axial end (e.g., the upper end loops), N−1 pitch end loops 54 on the second axial end (e.g., the lower end loops), and a middle end loop 52c with a pitch of N+2. For example, the upper end loops 52 may have a pitch of 7, the lower end loops 54 may have a pitch of 5, and the middle end loop 52c may have a pitch of 8. The winding arrangement also includes at least one Wire B 60 that is opposite Wire A, such that Wire B is flipped 180° relative to Wire A (i.e., the upper end turns become the lower end turns). Thus, Wire B has N−1 pitch end loops 62 on the first axial end (e.g., the upper end loops), N+1 pitch end loops 64 on the second axial end (e.g., the lower end loops), and a middle end loop 62c with a pitch of N. For example, the upper end loops 62 may have a pitch of 5, the lower end loops 64 may have a pitch of 7, and the middle end loop 62c may have a pitch of 6.

Figure 13:
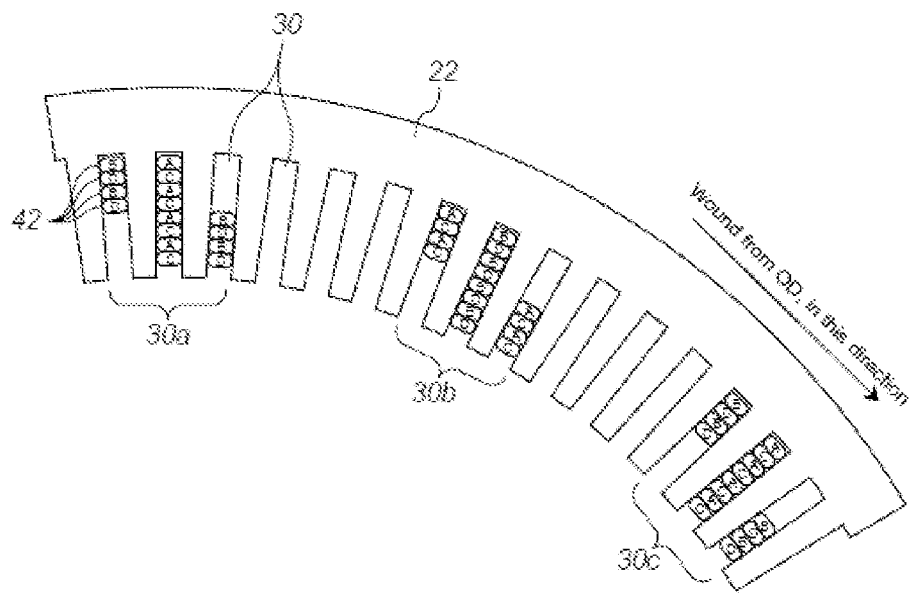
FIG. 13 shows a cross-sectional view of a portion of the stator core of the electric machine and stator core of FIG. 12, showing only those conductors for one phase of the winding arrangement.

FIG. 13 illustrates the 4-8-4 conductor arrangement for one phase of the winding over sets of three consecutive slots, 30a, 30b, and 30c. In the first slot set 30a and the third slot set 30c, the conductors in layers 1-4 of the left slot are respectively arranged B-D-B-D, the conductors in layers 1-8 of the middle slot are respectively arranged A-C-A-C-A-C-A-C, and the conductors in layers 5-8 of the right slot are respectively arranged B-D-B-D. In the second slot set 30b, the conductors in layers 1-4 of the left slot are respectively arranged A-C-A-C, the conductors in layers 1-8 of the middle slot are respectively arranged B-D-B-D-B-D-B-D, and the conductors in layers 5-8 of the right slot are respectively arranged A-C-A-C.

Figure 14:
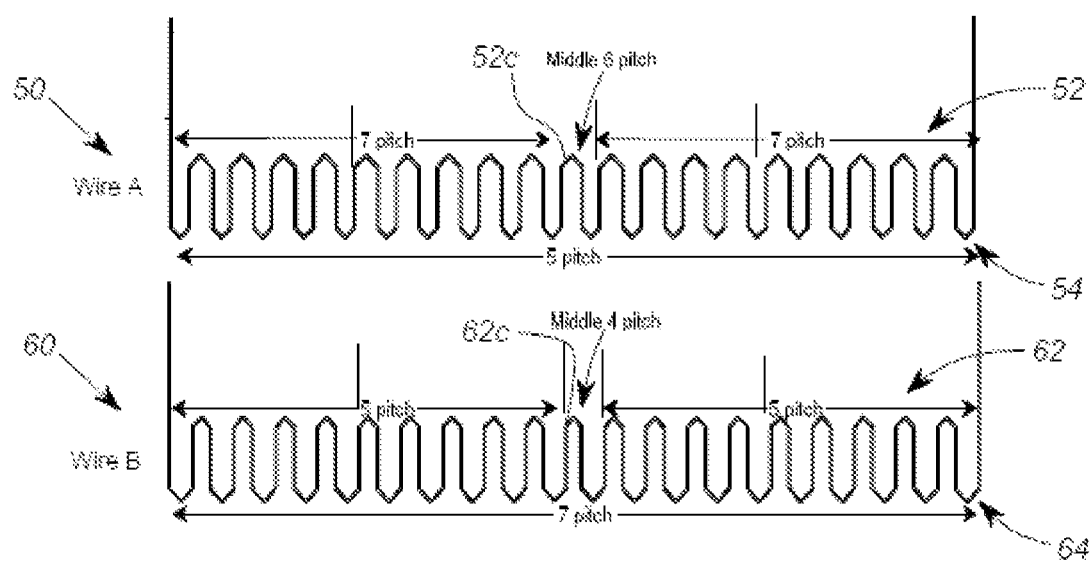
FIG. 14 shows a plan view of two wires for one phase of a second alternative embodiment of the winding arrangement shown in FIGS. 3-10.
Figure 15:
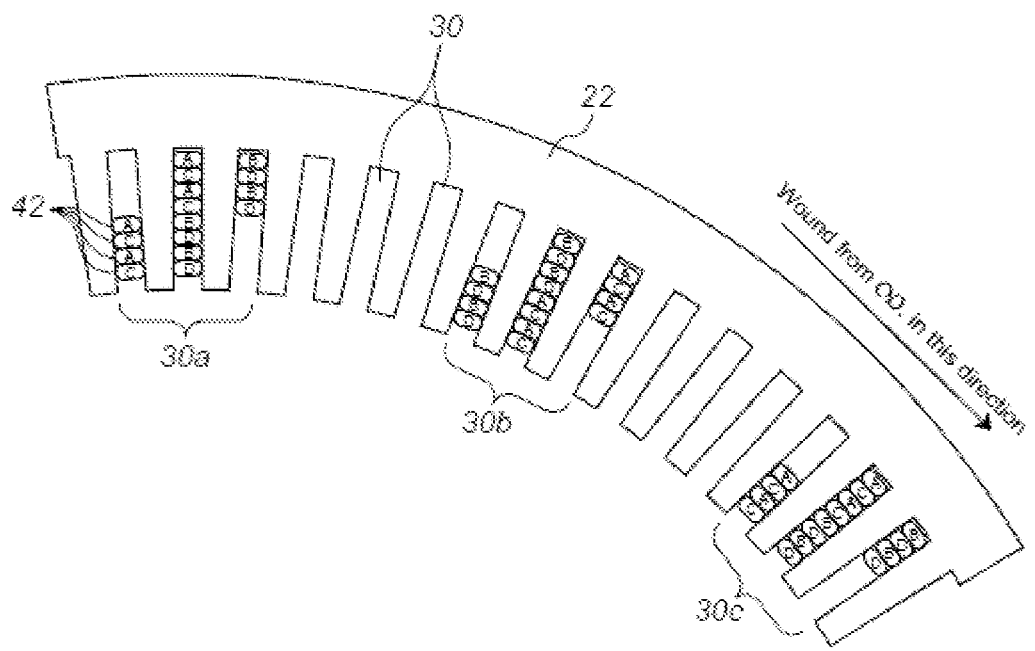
FIG. 15 shows a cross-sectional view of a portion of the stator core of the electric machine and stator core of FIG. 14, showing only those conductors for one phase of the winding arrangement.

With reference now to FIGS. 14-15, in at least one second alternative embodiment, the winding arrangement 40 is configured similar to that described above with reference to FIGS. 12-13, but the pitches of the middle end turns are slightly different from that of FIGS. 12-13. In particular, the winding arrangement includes at least one Wire A 50 having N+1 pitch end loops 52 on the first axial end (e.g., the upper end loops), N−1 pitch end loops 54 on the second axial end (e.g., the lower end loops), and a middle end loop 52c with a pitch of N. For example, the upper end loops 52 may have a pitch of 7, the lower end loops 54 may have a pitch of 5, and the middle end loop 52c may have a pitch of 6. The winding arrangement also includes at least one Wire B 60 that is opposite Wire A, such that Wire B is flipped 180° relative to Wire A (i.e., the upper end turns become the lower end turns). Thus, Wire B has N−1 pitch end loops 62 on the first axial end (e.g., the upper end loops), N+1 pitch end loops 64 on the second axial end (e.g., the lower end loops), and a middle end loop 62c with a pitch of N−2. For example, the upper end loops 62 may have a pitch of 5, the lower end loops 64 may have a pitch of 7, and the middle end loop 62c may have a pitch of 4.

FIG. 15 illustrates the 4-8-4 conductor arrangement for one phase of the winding phase over sets of three consecutive slots, 30a, 30b, and 30c. In the first slot set 30a and the third slot set 30c, the conductors in layers 5-8 of the left slot are respectively arranged A-C-A-C, the conductors in layers 1-8 of the middle slot are respectively arranged A-C-A-C-B-D-B-D, and the conductors in layers 1-4 of the right slot are respectively arranged B-D-B-D. In the second slot set 30b, the conductors in layers 5-8 of the left slot are respectively arranged B-D-B-D, the conductors in layers 1-8 of the middle slot are respectively arranged B-D-B-D-A-C-A-C, and the conductors in layers 1-4 of the right slot are respectively arranged A-C-A-C.

Figure 16:
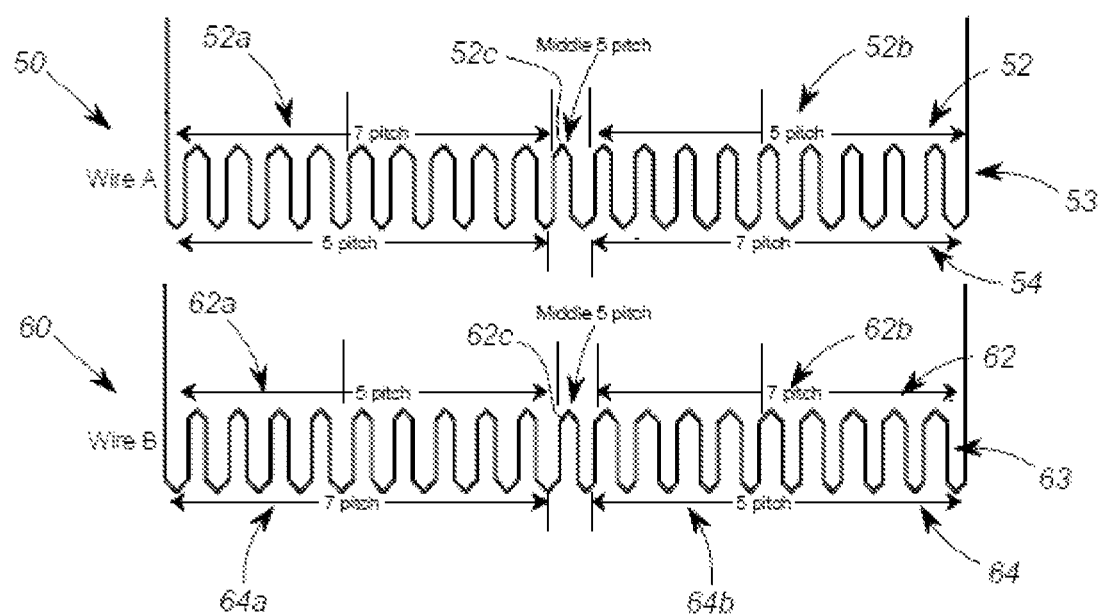
FIG. 16 shows a plan view of two wires for one phase of a third alternative embodiment of the winding arrangement shown in FIGS. 3-10.
Figure 17:
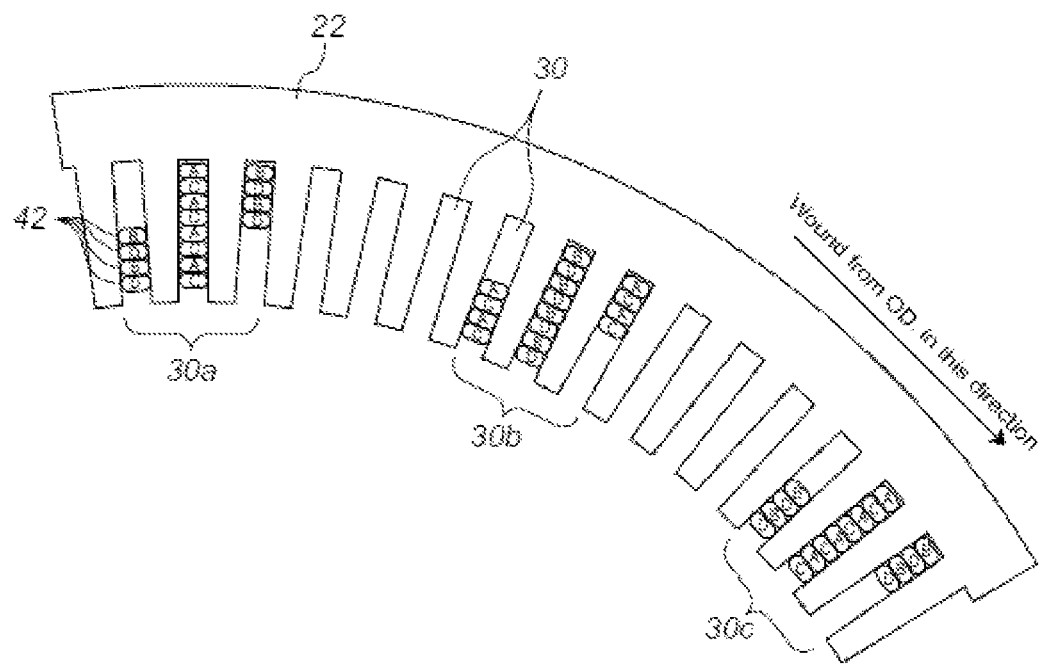
FIG. 17 shows a cross-sectional view of a portion of the stator core of the electric machine and stator core of FIG. 17, showing only those conductors for one phase of the winding arrangement.

With reference now to FIGS. 16-17, in at least one second alternative embodiment, the winding arrangement 40 is configured similar to that described above with reference to FIGS. 4-10, but the pitches of the middle end turns are slightly different from that of the embodiment of FIGS. 4-10. Thus, for the outer layers, Wire A has N+1 pitch end loops 52a (e.g., seven pitch) on the first axial end, and N−1 pitch end loops 54a (e.g., five pitch) on the second axial end. For the inner layers, Wire A has N−1 pitch end loops 52b (e.g., five pitch) on the first axial end, and N+1 end loops 54b (e.g., seven pitch) on the second axial end. Wire A also has an upper middle end loop 52c with a phase shift of N−1 (e.g., five pitch). Wire B is opposite the wire A in this embodiment, with Wire B being rotated 180° about the upper middle end loop 52c relative to Wire A.

FIG. 17 illustrates the 4-8-4 conductor arrangement for one phase of the winding phase over sets of three consecutive slots, 30a, 30b, and 30c. In the first slot set 30a and the third slot set 30c, the conductors in layers 5-8 of the left slot are respectively arranged B-D-B-D, the conductors in layers 1-8 of the middle slot are respectively arranged A-C-A-C-A-C-A-C, and the conductors in layers 1-4 of the right slot are respectively arranged B-D-B-D. In the second slot set 30b, the conductors in layers 5-8 of the left slot are respectively arranged A-C-A-C, the conductors in layers 1-8 of the middle slot are respectively arranged B-D-B-D-B-D-B-D, and the conductors in layers 1-4 of the right slot are respectively arranged A-C-A-C.

It will be recognized that different advantages may be recognized from each of the foregoing different embodiments. For example, the two embodiments of FIGS. 4-10 and 16-17 result in wires that are symmetrical about the middle end loop, allowing for all wires to be formed with the same zig-zag shape, and then half of the wires flipped to create the A and B wires, as described above. On the other hand, in the embodiments of FIGS. 12-13 and 14-15, the middle end loops do not cross one another, thus reducing the chances of an electrical short.

Vehicle Application

Figure 18:
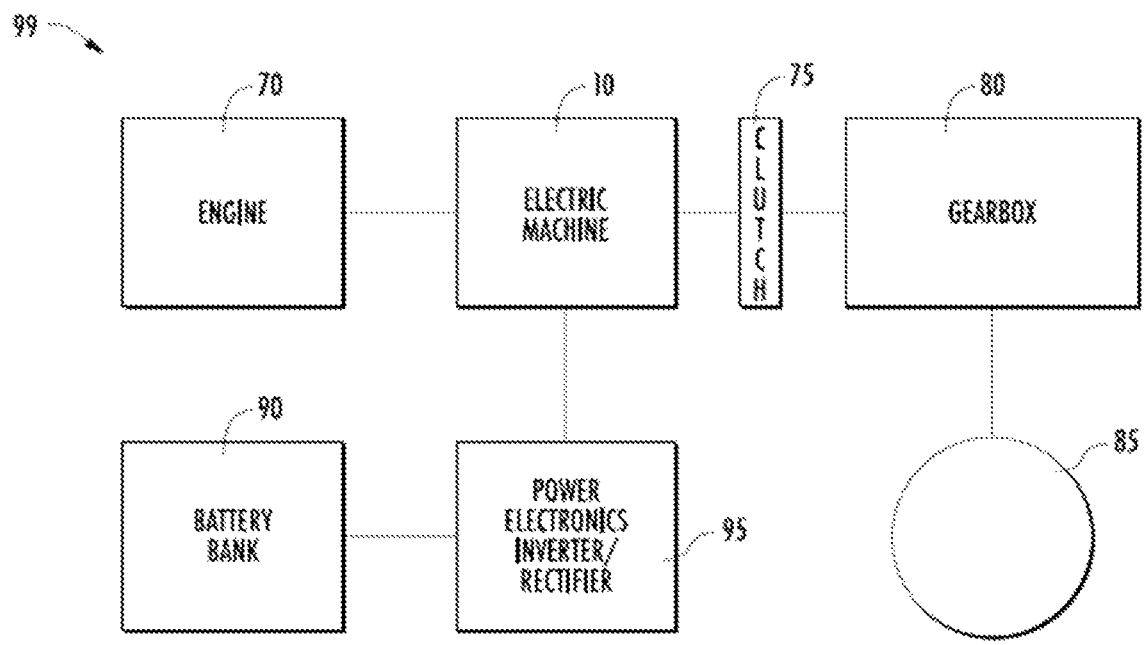
FIG. 18 shows a block diagram of a vehicle including the electric machine of FIG. 1.

In at least one embodiment, the electric machine 10 with a winding arrangement having alternating winding pitches is provided in an application where it serves as part of a hybrid electric drive system, such as the drive system for a hybrid electric vehicle. As shown in FIG. 18, the hybrid electric drive system 99 comprises the electric machine 10 which is operably connected to the drive shaft of an internal combustion engine 70. The electric machine 10 is also operably connected to a gearbox 80 through a torque converter or clutch 75. The gearbox is operable to drive the wheels 85 of the hybrid electric vehicle. In addition, the electric machine 10 is operably connected to a battery bank 90 through a power electronics inverter/rectifier 95. The power electronics inverter/rectifier 95 is operable to deliver electric power to the electric machine or absorb electric power from the batteries.

During operation of the hybrid electric vehicle, the electric machine acts as both a motor and a generator. Motoring operations include starter motor operation and vehicle drive operation. First, the electric machine 10 operates as an electric starting motor that cranks internal combustion engine 70. During this time of engine cranking, the clutch 75 disengages the gearbox 80 from the electric machine. During low speed vehicle drive operations, the clutch 75 connects the electric machine 10 and the gearbox 80, allowing the electric machine to act as the propulsion drive, turning the wheels 85 of the vehicle. The electric machine 10 may also act as a propulsion assist for the vehicle during vehicle acceleration. During high speed vehicle driving, the electric machine 10 is driven by the internal combustion engine 70 and operates as an alternator, providing electric power for onboard electric loads and charging the battery bank. Finally, during vehicle braking and deceleration, the electric machine 10 acts as a re-generator which converts kinetic energy from the vehicle to electric power for charging the battery bank 90.

The foregoing detailed description of one or more embodiments of the stator winding connection arrangement has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

Various embodiments are presented in the drawings and in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

What is claimed is:

1. A stator for an electric machine comprising:
   a stator core having a plurality of slots formed therein, the stator core defining a first axial end and a second axial end; and
   a winding arranged on the stator core, the winding comprising slot segments arranged in layers of the plurality of slots and end turns connecting the slot segments, the winding defining:
      a first winding path including outer layer end turns, inner layer end turns, and a transition end turn positioned between the outer layer end turns and the inner layer end turns; and
      a second winding path including outer layer end turns, inner layer end turns, and a transition end turn positioned between the outer layer end turns and the inner layer end turns, wherein the outer layer end turns of the second winding path nest with the outer layer end turns of the first winding path, and wherein the inner layer end turns of the second winding path nest with the inner layer end turns of the first winding path;
      wherein the transition end turns are middle end turns, and wherein the middle end turn of the second winding path crosses the middle end turn of the first winding path;
      wherein the outer layer end turns of the first winding path are defined by a first pitch on the first axial end and a second pitch on the second axial end, the first pitch being different from the second pitch, and wherein the middle end turn of the first winding path is defined by a third pitch; and
      wherein the outer layer end turns of the second winding path are defined by the second pitch on the first axial end and the first pitch on the second axial end.

2. The stator of claim 1,
   wherein the inner layer end turns of the first winding path are defined by the second pitch on the first axial end and the first pitch on the second axial end; and
   wherein the inner layer end turns of the second winding path are defined by the first pitch on the first axial end and the second pitch on the second axial end.

3. The stator of claim 2, wherein N is a defined number of slots per pole per phase for the stator, wherein the first pitch and third pitch are N+1, and wherein the second pitch is N−1.

4. The stator of claim 2 wherein N is a defined number of slots per pole per phase for the stator, wherein the first pitch is N+1, and wherein the second pitch and third pitch are N−1.

5. The stator of claim 4 wherein N=6.

6. A stator for an electric machine comprising:
   a stator core having a plurality of slots formed therein, the stator core defining a first axial end and a second axial end; and
   a winding arranged on the stator core, the winding comprising slot segments arranged in layers of the plurality of slots and end turns connecting the slot segments, the winding defining:
      a first winding path including outer layer end turns, inner layer end turns, and a transition end turn positioned between the outer layer end turns and the inner layer end turns; and
      a second winding path including outer layer end turns, inner layer end turns, and a transition end turn positioned between the outer layer end turns and the inner layer end turns, wherein the outer layer end turns of the second winding path nest with the outer layer end turns of the first winding path, and wherein the inner layer end turns of the second winding path nest with the inner layer end turns of the first winding path;
      wherein the outer layer end turns and inner layer end turns of the first winding path are defined by a first pitch on the first axial end and a second pitch on the second axial end, and wherein the transition end turn of the first winding path is defined by a third pitch; and
      wherein the outer layer end turns and inner layer end turn turns of the second winding path are defined by the second pitch on the first axial end and the first pitch on the second axial end, and wherein the transition end turn of the second winding path is defined by a fourth pitch, wherein the first pitch, second pitch, third pitch, and fourth pitch are all different pitches.

7. The stator of claim 6, wherein N is a defined number of slots per pole per phase for the stator, wherein the first pitch is N+1, wherein the second pitch is N−1, wherein the third pitch is N+2, and wherein the fourth pitch is N.

8. The stator of claim 6, wherein N is a defined number of slots per pole per phase for the stator, wherein the first pitch is N+1, wherein the second pitch is N−1, wherein the third pitch is N, and wherein the fourth pitch is N−2.

9. The stator of claim 8 wherein N=6.

10. A stator for an electric machine comprising:
    a stator core having a plurality of slots formed therein, the stator core defining a first axial end and a second axial end; and
    a multi-phase winding arranged on the stator core with a path for each winding phase, the path completing multiple revolutions around the stator core including an outer layer of end turns and an inner layer of end turns, and the path comprising a series of slot segments arranged in layers of the plurality of slots and end turns alternately connecting consecutive slot segments on the first axial end and the second axial end, wherein for the inner layer of end turns, the path includes end turns having a first pitch on the first axial end and a second pitch on the second axial end, the second pitch being different from the first pitch, and for the outer layer of end turns, the path includes end turns having the second pitch on the first axial end and the first pitch on the second axial end.

11. The stator of claim 10 wherein the slot segments are arranged in a single file in each of the plurality of slots and define multiple layers within each slot.

12. The stator of claim 11 wherein each parallel path of the winding includes outer layer end turns, inner layer end turns, and a transition end turn provided by a middle end turn between the outer layer end turns and the inner layer end turns.

13. The stator of claim 12 wherein the multiple parallel paths include a first path and a second path, wherein the end turns for the first path alternate between the first pitch on the first axial end and the second pitch on the second axial end, and wherein the end turns for the second path alternate between the second pitch on the first axial end and the first pitch on the second axial end.

14. The stator of claim 13 wherein N is a defined number of slots per pole per phase for the stator, wherein the first pitch is N+1, and wherein the second pitch is N−1.

15. The stator of claim 14 wherein the middle end turn for the first path and the second path have a same pitch of N+1 or N−1.

16. The stator of claim 14 wherein the middle end turn for the first path has a pitch of N+2 and the middle end turn for the second path has a pitch of N.

17. The stator of claim 14 wherein the middle end turn for the first path has a pitch of N and the middle end turn for the second path has a pitch of N−2.

18. The stator of claim 13 where N is 2.

* * * * *